(12) United States Patent
Hamby et al.

(10) Patent No.: US 8,539,457 B2
(45) Date of Patent: Sep. 17, 2013

(54) PARTIAL ON-DEMAND LAZY SEMANTIC ANALYSIS

(75) Inventors: John Lawrence Hamby, Seattle, WA (US); Joshua Ryan Williams, Seattle, WA (US); John D. Doty, Seattle, WA (US); Clemens A. Szyperski, Redmond, WA (US); David Michael Miller, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 12/613,925

(22) Filed: Nov. 6, 2009

(65) Prior Publication Data

US 2011/0113408 A1 May 12, 2011

(51) Int. Cl.
G06F 9/45 (2006.01)
G06F 9/455 (2006.01)

(52) U.S. Cl.
USPC .......................................... 717/136; 717/151

(58) Field of Classification Search
None
See application file for complete search history.

(56) References Cited

U.S. PATENT DOCUMENTS

| 5,325,531 | A | 6/1994 | McKeeman | |
|---|---|---|---|---|
| 6,182,281 | B1 | 1/2001 | Nackman | |
| 7,441,238 | B2 | 10/2008 | Zatloukal | |
| 7,571,160 | B2 * | 8/2009 | Riccardi et al. | 1/1 |
| 8,200,718 | B2 * | 6/2012 | Roberts | 707/813 |
| 2003/0056022 | A1 * | 3/2003 | Carlson et al. | 709/315 |
| 2004/0225999 | A1 * | 11/2004 | Nuss | 717/114 |
| 2005/0114328 | A1 * | 5/2005 | Riccardi et al. | 707/3 |
| 2008/0071799 | A1 | 3/2008 | Evans | |
| 2008/0201701 | A1 * | 8/2008 | Hofhansl et al. | 717/168 |

OTHER PUBLICATIONS

Hedin; Incremental Semantic Analysis—Published Date: Mar. 1992; pp. 1-282; http://www.cs.lth.se/home/Gorel_Hedin/publications/1992-HedinThesis.pdf.
Boullier; Dynamic Grammars & Semantic Analysis—Published Date: 1994; pp. 1-54 ftp://ftp.inria.fr/INRIA/publication/publi-pdf/RR/RR-2322.pdf.
Maddox; Incremental Static Semantic Analysis—Published Date: May 1997; pp. 1-188 http://www.cs.berkeley.edu/Research/Projects/harmonia/papers/maddox-thesis.ps.gz.
Linden; Incremental Updates in Structured Documents—Published Date: Feb. 5, 1994; pp. 1-152 https://oa.doria.fi/bitstream/handle/10024/2894/incremen.pdf?sequence=1.
Wagner; Incremental Analysis of Real Programming Languages—Retrieved Date: Oct. 14, 2009; pp. 1-13 http://citeseerx.ist.psu.edu/viewdoc/download;jsessionid=809C6B4CBA9FED9E9DAFFD-43F26315D3?doi=10.1.1.21.3918&rep=rep1&type=url&i=0.

* cited by examiner

*Primary Examiner* — Hyun Nam
(74) *Attorney, Agent, or Firm* — Workman Nydegger

(57) ABSTRACT

Computing responses to semantic queries. A method includes accessing a plurality of objects that represent source code for an input program. The source code is transformed into a plurality of immutable objects that are structured such that the immutable objects can be used to derive any response as defined by the semantic rules about the source code. A query is received from a requestor requesting a semantic characteristic of the input program. The semantic characteristic is calculated. The semantic characteristic is returned to the requestor. The semantic characteristic is cached in a cache. Information describing a dependency between the cached semantic characteristic and one or more of the objects in the plurality of objects is stored.

34 Claims, 5 Drawing Sheets

PARTIAL ON-DEMAND LAZY SEMANTIC ANALYSIS

BACKGROUND

Background and Relevant Art

Computers and computing systems have affected nearly every aspect of modern living. Computers are generally involved in work, recreation, healthcare, transportation, entertainment, household management, etc.

Various software domains, including but not limited to computer language compilers and programming systems, employ semantic analysis engines. A semantic analysis engine operates on instances of representations in its semantic domain to answer queries about the meaning of those instances. In particular, semantic analysis can analyze relationships between objects, and derive associated properties that can then be used to answer queries about the relationships. The extent of the analysis necessary to answer specific queries is a major factor in the responsiveness of an engine.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment may be practiced in a computing environment including a semantic analysis engine. The semantic analysis engine is a process that applies specific rules to derive characteristics of a group of objects where small deltas occur over a large number of objects. The method includes acts for computing responses to semantic queries. The method includes accessing a plurality of objects that represent source code for an input program. The source code is transformed into a plurality of immutable objects that are structured such that the immutable objects can be used to derive any response as defined by the semantic rules about the source code. A query is received from a requestor requesting a semantic characteristic of the input program. The semantic characteristic is calculated. The semantic characteristic is returned to the requestor. The semantic characteristic is cached in a cache. Information describing a dependency between the cached semantic characteristic and one or more of the objects in the plurality of objects is stored.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein enhance processing efficiency by starting with a base semantic object structure including immutable (unchangeable) semantic objects that can be used for any, or at least a large portion of queries that may be made against a set of objects and their relationships. Thus, embodiments are enhanced by starting from instances of domain representations (i.e. representations of immutable semantic objects) that are structurally complete but contain no bindings of names or any information derived from any sort of binding. A semantic engine responds to a query by deriving a minimal set of knowledge sufficient to answer the query and storing the derived information so as to accelerate responses to future queries. In particular, in some embodiments, the derived information can be cached. Because an engine does not mutate the domain representation instances or share its derived information, multiple engines can operate on the same instances. An engine responds to external changes in the domain representation instances by discarding derived information dependent on changed instances.

Thus, briefly summarizing, a domain representation instance including a number of objects is transformed into a semantic representation which includes a plurality of immutable semantic objects. As queries are received requesting characteristics about the domain representation, the semantic objects can be analyzed to generate the semantic characteristics which can then be stored and reused as needed. Changes to the domain representation do not require a retransformation of the semantic representation, but rather calculated characteristics dependent on changed portions of the domain representation can simply be discarded and recalculated.

Thus, some embodiments include a separation of semantic representations into immutable semantic objects and engine-derived values. Embodiments may exhibit highly responsive and complete semantic analysis in an environment of frequent incremental updates, e.g. responsive and accurate language services in an interactive programming system. Embodiments may exhibit separation of semantic requirements checking, generation of transformed output, and interactive semantic services, all potentially performed using the same engine. E.g., embodiments may be implemented where neither compiler code generation nor language IntelliSense depend on semantic requirements checking. Embodiments may use caches for cycle detection as well as performance acceleration. Embodiments may merge partial constructs (e.g. partial classes) without merging domain representations.

Examples described herein focus primarily on embodiments in the domain of computer language compilation. However, the solution has applicability beyond language compilers, and can be used in numerous environments where semantic analysis is appropriate.

Figure 1:
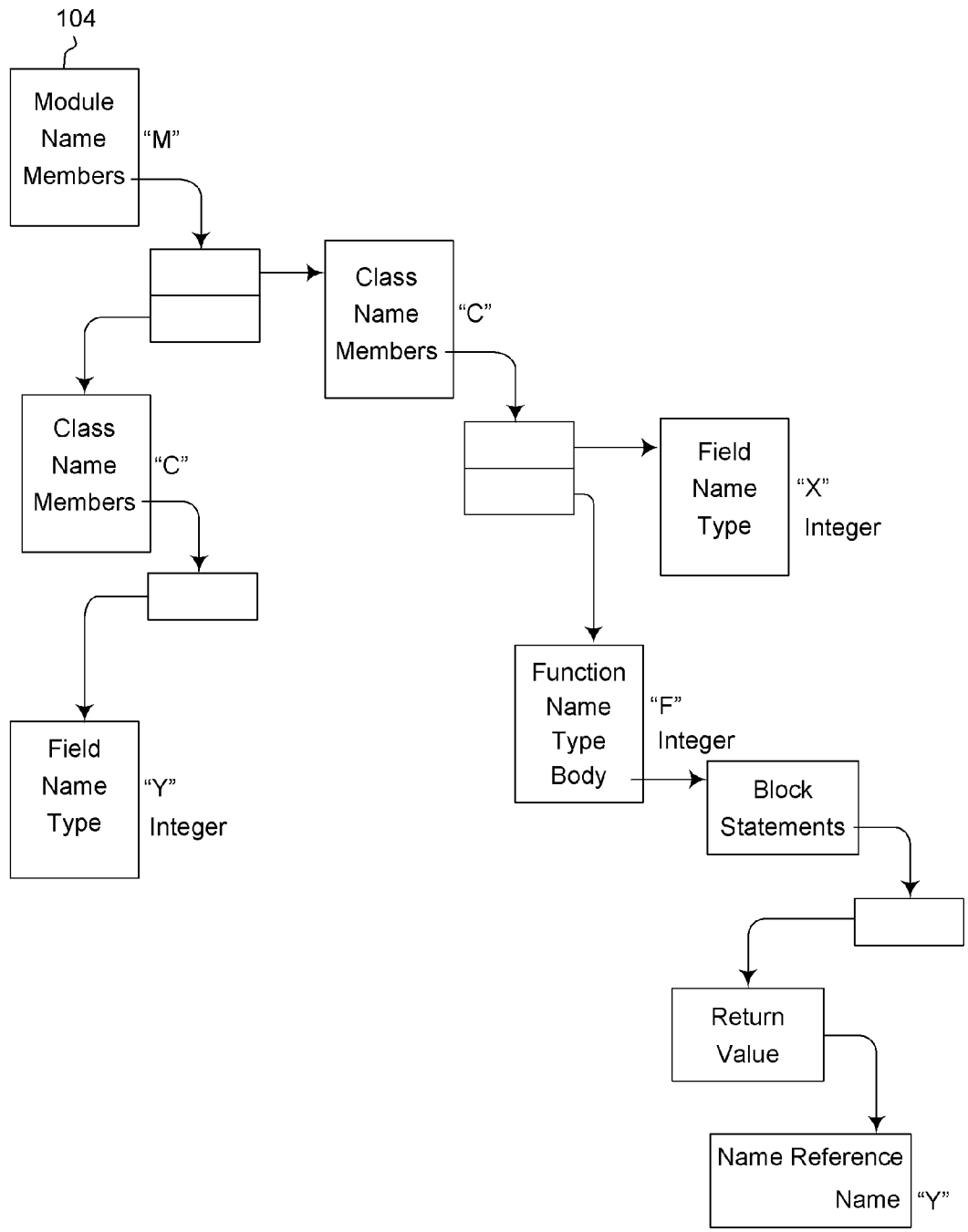
FIG. 1 illustrates a translation of a parse tree to a semantic tree.
Figure 2:
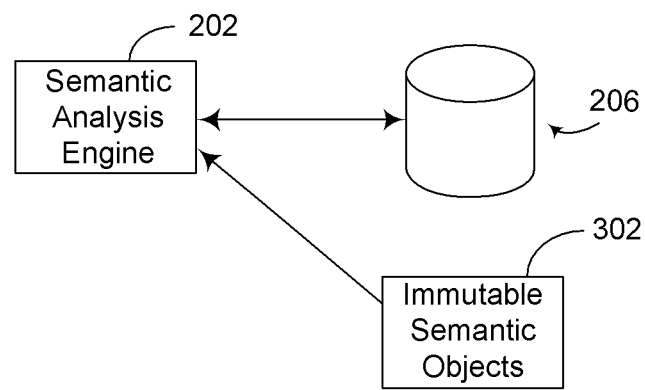
FIG. 2 illustrates a system including a semantic analysis engine, a collection of immutable semantic objects, and a cache for caching characteristics.
Figure 3A:
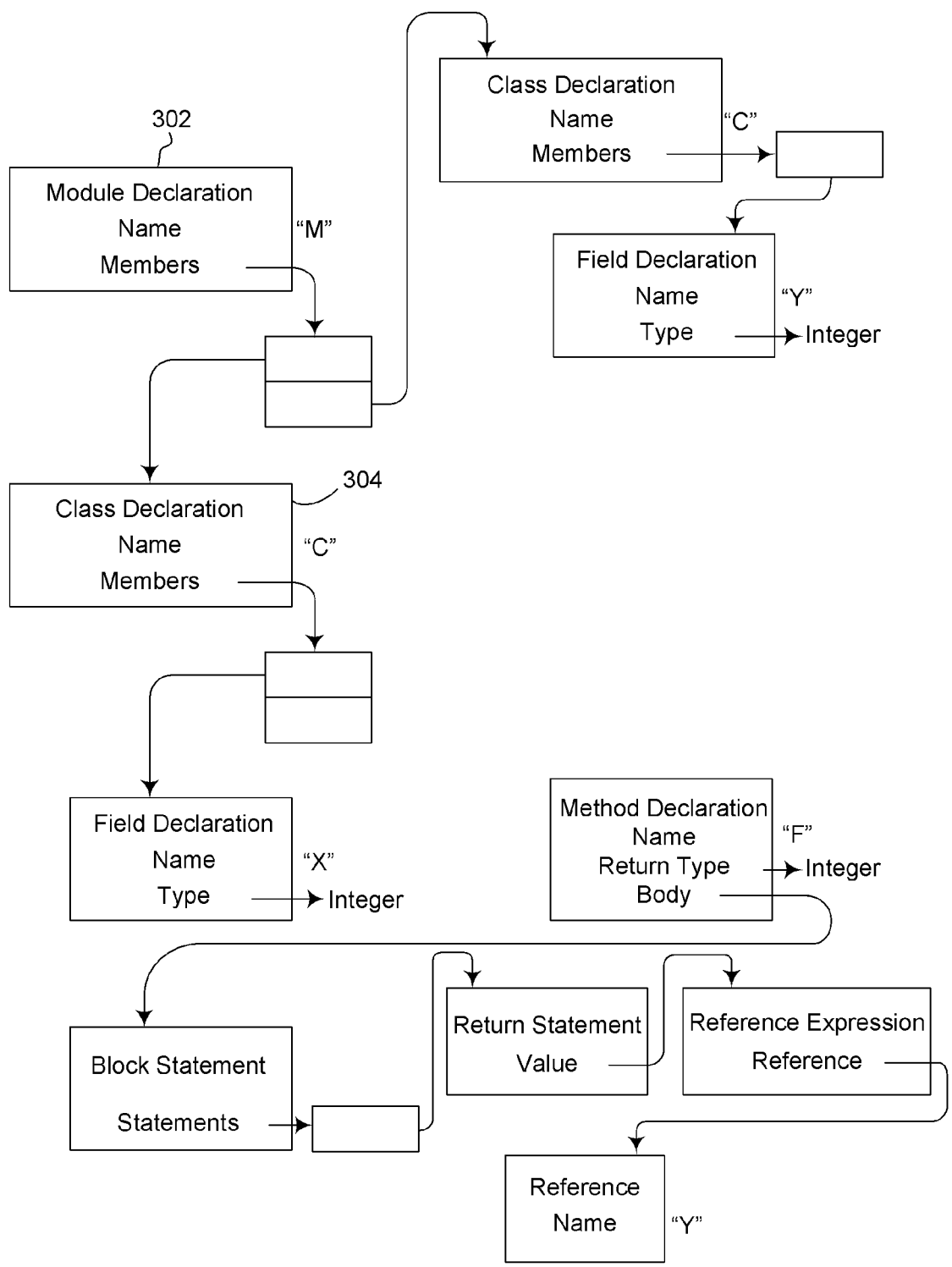
FIG. 3A illustrates object representations of portions of an input program.

Illustrating now a general example, with reference to FIG. 1 and FIG. 3A, a set of instances of semantic objects 302, illustrated as a semantic tree, represents some domain coming into being. For example, a compiler may generate a set of instances of semantic objects representing the input program, illustrated as a parse tree 104, as part of, or immediately after parsing. Referring now to FIG. 2, a semantic analysis engine 202 makes no changes to these objects, illustrated as immutable semantic objects 302, in any of its operations. In some embodiments, this enables sharing semantic objects for multiple purposes and enables parallelizing the compilation process.

A set of functional queries are made over the semantic objects 302 by the semantic analysis engine 202. Examples in a compiler may include the binding of a name or the set of members of a type. In response to a query, the engine interrogates a cache 206 where the answer would reside. If an answer is not present in the relevant cache 206, the engine 202 computes an answer and caches it in the cache 206. Notably, the process of computing the answer may access other cached information in the cache 206.

The semantic object instances may change between queries. By tracking dependencies between semantic objects and cached information, the engine 202 can compute a minimal set of cached information to discard, and thereby minimize the amount of future work to be done in response to changes.

A full compilation will likely completely populate the caches. At the completion of compilation, the semantic objects 302 and the caches 206 together contain the information retained in a typical compiler's symbol table. However, partial compilation and/or serving IntelliSense queries will typically populate only a fraction of the caches, and so save work over a complete analysis.

Embodiments may be implemented where all queries have well-formed results, even in the presence of violations of semantic requirements. For example, in a compiler example, if a name has no binding, a request for its binding produces a synthesized object representing the absence of a binding. Similarly, if an expression is semantically invalid, a request for the result type of the expression produces a representation of an invalid type. This requirement simplifies designing clients of an engine, and makes it possible to separate checking semantic requirements checking from other operations.

The caches 206 include mechanisms for marking when the computation of a value to be cached is in progress and thereby automate detection of implied cycles in relationships between semantic objects. This is a meaningful simplification in the design of compilers for languages that require cycle detection. For example, a set of semantic objects may be part of a cyclical relationship. Illustratively, a semantic graph may have an object A that points to an object B that points to an object C which points to the object A. This graph is cyclical due to the pointing back to object A. Embodiments may include functionality, as described below, where multiple queries for the same characteristic facilitates a determination that an object is cyclical.

Building on the cache mechanism, the engine 202 collects query results common to a set of semantically merged partial objects into cache objects that serve as representations of the complete form of the partial objects. This mechanism radically simplifies the treatment of partial objects relative to the implementations of partial classes in various compilers.

A particular example is now illustrated. FIG. 3A shows a set of semantic objects that a compiler might generate to represent either the C# code:

```
module M
{
    class C
    {
        int X;
        int F( ) { return Y; }
    }
    partial class C
    {
        int Y;
    }
}
``` or the Visual Basic code:

```
Module M
    Class C
        X As Integer
        Function F( ) As Integer
            Return Y
        End Function
    End Class
    Partial Class C
        Y As Integer
    End Class
End Module
```

Figure 3B:
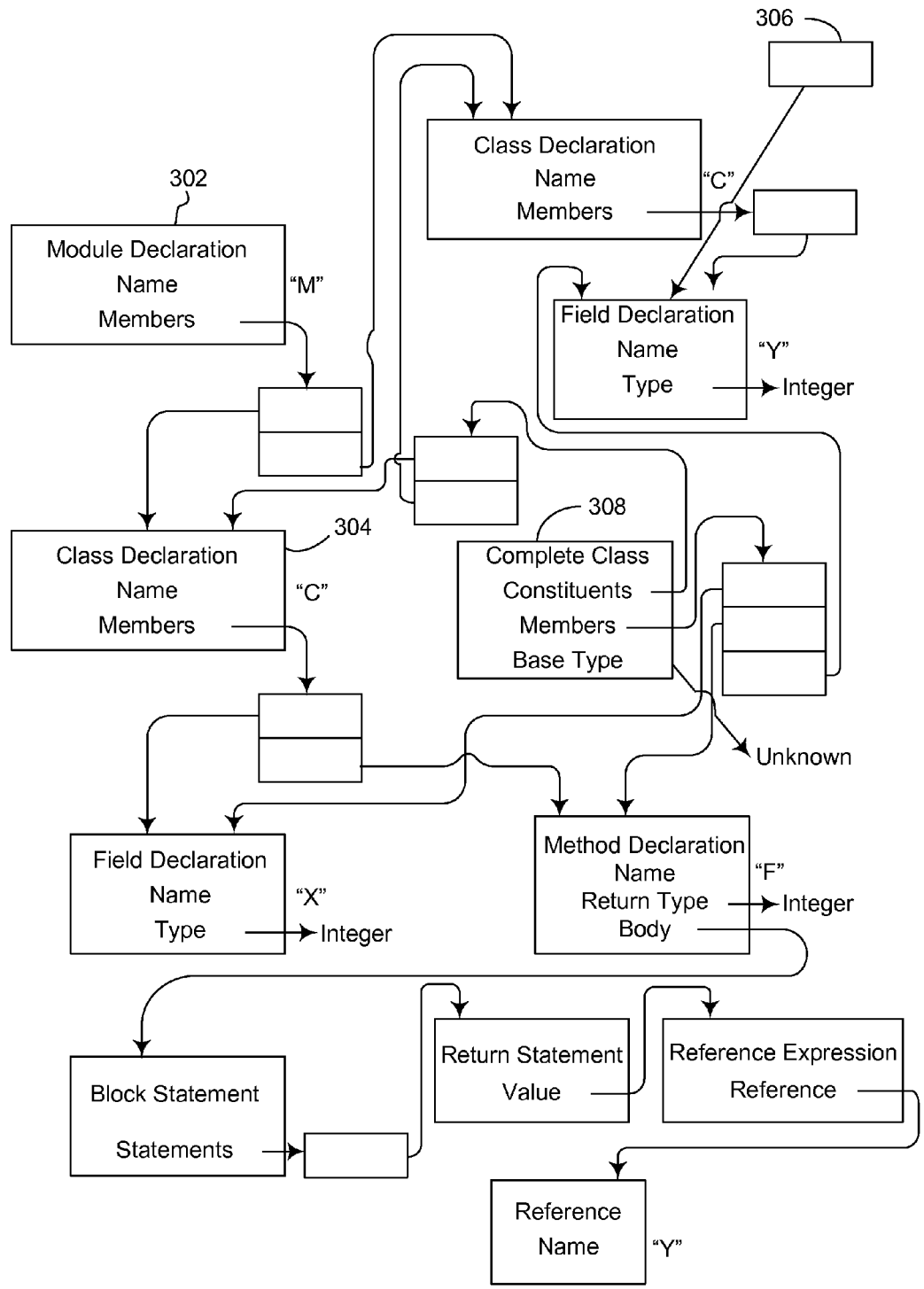
FIG. 3B illustrates object representations along with cached characteristics of an input program.

FIG. 3B shows the same semantic objects plus cached values computed during the processing of the binding of the reference to "Y". FIG. 3B illustrates a CompleteClass object 308 for class C 304, with its Constituents and Members cached and its BaseType indeterminate. In this example, the BaseType for the CompleteClass object 308 is unknown because that value was not necessary in computing a binding for "Y". FIG. 3B illustrates a cache cell 306 for the binding to "Y".

The following discussion now illustrates additional details that may facilitate use of some embodiments.

A semantic analysis engine 202 operates over semantic objects 302 which are created as a simple transformation off of a parse tree 104. A characteristic of the objects 302 in the semantic tree is that once created, they are immutable during semantic analysis. This immutable semantic tree makes up the backbone of the analysis, in that each of the objects knows some limited amount of data which can be derived from the parse tree. For example, the lexical children and potentially its parent, and/or local data like the 'name' for a declaration can be derived.

Each node is also able to answer some set of queries about itself. For instance, expressions are able to give an object representing their type, declaration references are able to retrieve their target declaration and declarations are able to provide their name. Those queries are communicated to the caller (sometimes referred to herein as the requestor) in the form of either atomic results (integers, identifiers, etc) or objects which are themselves immutable and were created in a side-effect free manner. Some of these results are required to have a constant object identity throughout the semantic analysis episode. Other results do not have an identity requirement but are expensive to compute. Because the semantic objects 302 themselves are immutable, the results are instead stored in a centralized compilation wide table from which they can be retrieved when the query is asked again. These objects also feature the ability to answer their own set of queries in a lazy manner (for example also storing their results in a centralized table). The distinction between results which are required to maintain identity and those which are merely cached is made at the definition site for the lazy value.

Given the desire to support language services, and not need to recalculate a large number of still valid answers, some embodiments allow for mutation of the semantic objects while no semantic analysis is occurring. A compiler's cached/lazy value system may be built with integrated dependency management so that when sections of the tree are removed, stored results that may have depended on state that is no longer valid can be invalidated. Embodiments may be implemented where these modifications are only allowed during periods when no semantic analysis is concurrently occurring. Language services can cancel analysis, but will need to wait for it to rendezvous before modifications can be made. After a modification, semantic analysis may resume and any still valid cached data will be used to answer queries more quickly.

Computed results may change as a result of changes to semantic objects. If results were stored into the semantic object, the semantic objects tree may need to be re-created after each user edit. Many of these results are expensive and would be unacceptably slow to calculate every time the answer to a query was needed.

An interesting result of having immutable semantic objects with centrally stored side-effect free computed results is that the central store can be used as an isolation mechanism and the same semantic objects can be used from multiple threads. Language services can take advantage of this property to concurrently do full requirements analysis and code generation on a background thread while being able to answer semantic queries like completions on a different thread, all using the single set of instances of the semantic representation of the input program.

Embodiments may be implemented where all answers to queries asked of semantic objects are computed in a side-effect free manner and are themselves immutable. Embodiments can use mutating algorithms to produce a result, but once produced a result may not change Intermediate results live by the same rules as semantic objects that come straight from the parse tree 104 in that they are immutable and produce immutable side-effect free results. This allows results to be calculated in any order and allows for arbitrarily throwing away and recalculating results across edits to the parse tree 104.

Embodiments may be implemented where nothing computed is stored in semantic objects 302, instead, all results are computed lazily. Memorization is used to avoid having to compute expensive results multiple times.

Cached values can be shared across semantic objects that can be proved to have necessarily identical results. For example, in an object-oriented language, two member accesses that have identically-typed object operands and identical member names necessarily bind to the same member, and so semantic objects representing such member accesses can share a cached member binding.

Some lazily computed values have object identity requirements over the lifetime of the compilation. These may be durable across dependency invalidation, these objects maintain a sideband mechanism for invalidating the cached transient state they contain.

Some embodiments are implemented where any participant in a merged semantic object (e.g. graph node, module) can be asked queries of the complete object and will answer with the complete result by proxy. A number of parts of the compiler language may be merged (e.g. partial classes in C#). It may be preferable to not need to pick a canonical contributor to the merge to answer all queries given that the set of contributors may change across edits. Instead, all contributors to the complete semantic construct may be able to answer all of the queries which need to be answered of the complete construct.

Embodiments may be implemented whereby there is no need to use stale data to answer language services queries like auto completions. Many language services implementations store results of semantic analysis in some kind of in-memory data store which is thought of as being updated transactionally at the end of a fixed phase of semantic analysis. Before that phase is reached, a previously cached version is used to compute the necessary answers. Frequently this requires the ability to get the entire program, or at least a given buffer or file and its dependents, to a given phase of semantic analysis.

However, some embodiments illustrated herein, instead use designs around simple semantics building and laziness. A compiler can provide a very fast ability to: parse the buffer, build the relevant new semantic objects, invalidate dependent cache lines, and swap the new semantic objects into the tree. From that point answering a relevant language services query correctly is a matter of computing only the minimal path of semantics answers relevant to the particular language services query being asked.

Embodiments may be implemented whereby language services (e.g. completions) can be provided without the compiler having to do requirements processing.

Some computing tasks can be made faster if the processing has previously been done (e.g. find-all-references to a symbol can potentially use the dependency management data to only need to search dependent units).

As illustrated in FIG. 1, a parser can accept input text such as:

```
module M
{
    class C
    {
        int X;
        int F( ) { return Y; }
    }
    partial class C
    {
        int Y;
    }
}
``` to produce a parse tree 104 as illustrated in FIG. 1. This tree of objects represents the syntax of the program. These objects additionally contain an enormous amount of source location information needed by language services which is superfluous for other parts of the compiler.

Before semantic analysis begins, the parse tree 104 is converted into resulting semantic objects 302. These objects know how to answer various semantic queries, perform bindings, synthesize types, and are immutable after initialization is finished. Embodiments may be implemented where semantic objects are as sparse as possible for performance reasons. For instance an optimization may be implemented where not all objects contain things like parent pointers. Instead types which need to access context will get that context passed to them.

Embodiments may implement a parser that deals with malformed input to make sure that there are no invalid parse trees. Alternatively, embodiments may fill in a well-known set of empty slots with appropriate error objects (e.g. error expressions, error type references, etc).

Semantic objects in the illustrative compiler embodiments are both immutable and lazy. Given this combination they will almost by definition need to calculate non-trivial things on the fly to answer queries. To amortize the costs of these computations, the results of expensive ones are cached. For instance, if a semantic object implements a scope interface and has some number of elements which it introduces into scope then chances are good that a dictionary would be the optimal lookup structure for name resolution. However given the lazy nature of the semantic object, the dictionary cannot be computed at construction time. Instead, embodiments may compute it at first use and cache it. From then on the dictionary is fetched from the cache and the lookup is performed.

Embodiments may be implemented where caches 206 are per compiler context. This allows them to be isolated from the semantic objects themselves so that multiple processors may share a given semantic tree in a thread-safe manner.

Embodiments may be implemented where cached values are immutable and created in a side-effect free manner. Language services hinge on the ability to invalidate some set of the cached values for a given program and then recompute them on demand while retaining other cached values which are not dependent on the changed input.

Semantic objects that have merging behavior have a mechanism for storing merged state. For example, in the case of C# partial classes, the merged state includes the list of partial classes that make up the complete class, a list of all members declared in the various partial classes, and a dictionary to make looking up members of the complete class fast.

Merged state values could all be stored in cache lines which are shared among all the partials using the compiler's cache line sharing mechanism. However, collecting the merged state into a single complete object representing the merged partials serves an important purpose: it provides an object identity for the merged partials. Embodiments may include a merged identity function which is defined from a given partial object to its merged complete object. The merged identity is the combination of the complete object representing the partial object's semantic parent and whatever makes the partial unique in its given context. For example, for C# partial classes the merged identity function is in terms of the complete object for the namespace or class containing the partial class, the name of the partial class, and the partial class's generic parameters.

For semantic objects which have merging behavior, a complete object is defined as that which serves as both the merged identity for rendezvous and the storage for cached merged results. This complete object is stored in a normal cache line which is shared among all the merged partials.

Caches are usually indexed by object identity of the semantic object which computes the cached result. However, in a few cases the computed result can be shared among multiple semantic objects to avoid having to be computed many times. Because the complete objects for merged semantics are also stored via the same caching system, they also take advantage of the ability to share cache lines.

To share a cache line an implementation of an object which provides a mechanism for comparing two semantic objects for equivalence is provided at cache line construction time which will be used to determine that two semantics objects are equivalent for the purposes of cache line sharing. For cases like the merged object this is trivial. For instance, if both objects should be C# partial type declarations and have the same value for their Name property as well as residing in the same namespace they can be treated as equivalent. However for more complex cases there are a limited number of opportunities for sharing. For instance, in the case where a member of a type is being accessed in an expression; if the same value for the Name property of the member being accessed as well as the same declaration or type being accessed over, the expressions can be considered to be equivalent. Embodiments may be implemented where all cache line constructors require an equality comparer parameter. Before deciding to share non-merged cache lines, care may be taken to make sure the exact equality rules of the semantic in query are understood as well as the implications for dependency management. The equality comparer may be fast. In some embodiments, it is reasonable to sacrifice some potential sharing to make these much faster. Thus, if two things are equal they may result in the same computed values, however two things that result in the same computed values are not required to be equal as per the specified equality comparer.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed. Further, it should be understood that the methods may be practiced by a computer system including one or more processors and computer readable media such as computer memory. In particular, the computer memory may store computer executable instructions that when executed by one or more processors cause various functions to be performed, such as the acts recited in the embodiments.

Figure 4:
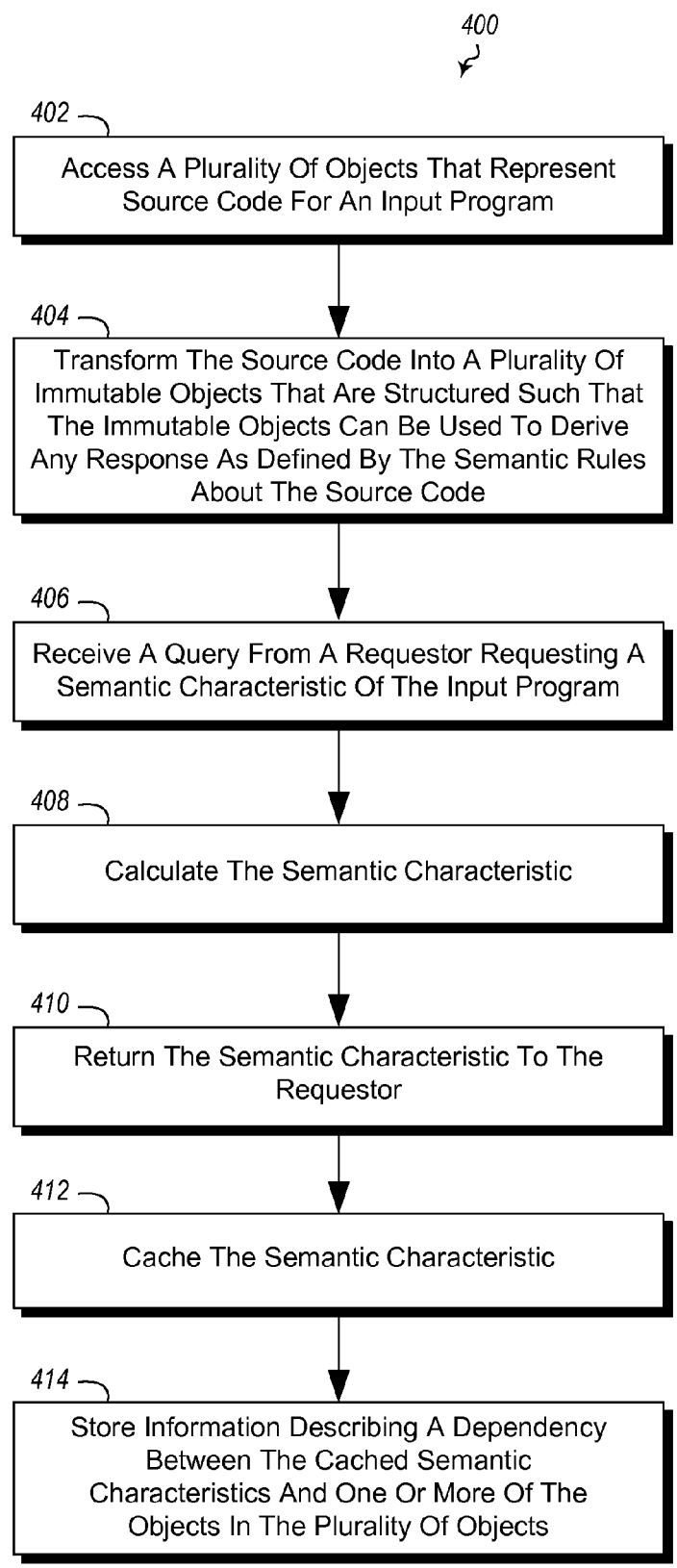
FIG. 4 illustrates a method of computing responses to semantic queries.

Referring now to FIG. 4, a method 400 is illustrated. The method 400 may be practiced in a computing environment including a semantic analysis engine. The semantic analysis engine is a process that applies specific rules to derive characteristics of a group of objects where small deltas occur over a large number of objects. The method includes acts for computing responses to semantic queries. The method includes accessing a plurality of objects that represent source code for an input program (act 402). For example, as illustrated in FIG. 1, a parse tree 104 may be accessed by a computer module.

The method 400 further includes transforming the source code into a plurality of immutable objects that are structured such that the immutable objects can be used to derive any response as defined by the semantic rules about the source code (act 404). In particular, embodiments may be practiced where a syntactical transformation of a parse tree 104 to a semantic tree including a plurality of immutable semantic objects 302 may be performed.

The method 400 further includes receiving a query from a requestor requesting a semantic characteristic of the input program (act 406). A requestor may be any one of a number of different entities. For example, a discussed above, language service applications or modules may request information for various language service functions such as auto-complete functionality. Other applications may allow human users to enter queries through a user interface which then sends queries for requesting semantic characteristics of the input program. Still other applications or modules may send queries.

The method 400 further includes calculating the semantic characteristic (act 408). In particular, various calculations may be done as described above to calculate a semantic characteristic, such as binding of names or other information derived from binding.

The method 400 further includes returning the semantic characteristic to the requestor (act 410). The method 400 further includes caching the semantic characteristic (act 412). For example, the semantic characteristic may be cached in a cache 206.

The method 400 further includes storing information describing a dependency between the cached semantic characteristic and one or more of the objects in the plurality of objects (act 414). In computing a characteristic, the method 400 may store a dependency on each semantic object visited in the computation. Thus, when changes are made to a semantic object, the cache entries for the computed characteristics of all semantic objects dependent upon the changed object can be invalidated. Thus, the method 400 may further include detecting a change in one or more of the objects depended upon, and as a result invalidating some cached semantic characteristics. The method 400 may be practiced where the dependency is computed according to a compilation granularity identifying objects allowed to change individually over time, with the granularity selected for advantageous results. For example, in compiling objects representing C# classes, dependencies can be collected on individual member declarations or on the declaration of the class as a whole including its member declarations, and cache invalidation can be performed for individual member declarations or for the class as whole including its member declarations.

Additionally, embodiments may be practiced where the method 400 stores dependencies from semantic objects to names, so that cache entries for values of computed characteristics representing name bindings can be invalidated when semantic objects are changed to introduce new declarations of previously bound names.

The method 400 may be practiced where calculating the semantic characteristic is performed as a result of calculating a plurality of semantic characteristics. For example, a calculation may calculate a list of characteristics even though only a single member of the list is needed. The entire list can nonetheless be cached and any part of the list retrieved in subsequent requests for characteristics.

The method 400 may further include receiving another query requesting the semantic characteristic of the input program; retrieving the semantic characteristic from the cache; and returning the semantic characteristic without recalculating the semantic characteristic. This example illustrates a functional use of cached characteristics.

The method 400 may be practiced where caching the semantic characteristic includes caching the semantic characteristic with other related semantic characteristics to create an aggregated semantic characteristic. For example, a first portion of a characteristic may be calculated and stored. Subsequent requests may result in additional portions of the semantic characteristic being calculated and stored together with the first portion. Such embodiments may further include as a result of creating the aggregated semantic characteristic flushing the semantic characteristic and related semantic characteristics while retaining the aggregated semantic characteristic.

The method 400 may be practiced where calculating the semantic characteristic is performed independently of error checking of the plurality of objects. In particular, while embodiments may be used to perform error checking, calculation of characteristics can be performed exclusive of error checking.

Embodiments may include functionality for detecting cycles. A cycle occurs when the computation of a semantic characteristic requires the value of the semantic characteristic. To detect cycles, the method 400 may further include while the act of calculating is occurring receiving another identical query to query requesting a semantic characteristic of the input program currently being computed and as a result caching an indicator indicating that the semantic characteristic is cyclical. Thus, if a query is made for a characteristic that is already being calculated, it is known that the semantic characteristic is cyclical. Later queries asking if the characteristic is cyclical, can then be answered in the affirmative.

The method 400 may be practiced where calculating the semantic characteristic is performed by only calculating characteristics necessary to calculate the semantic characteristic. In particular, to calculate a characteristic, it may be necessary to calculate other characteristics. By calculating only those characteristics necessary, computing efficiency and computer resource (e.g. memory, etc) can be realized.

The method 400 may be practiced where the query is received as a result of an input feedback mechanism needing characteristics to respond to user input. For example, the input feedback mechanism may be an auto-complete feedback mechanism of a language service component. By keeping the caches of such concurrent analyses in separate contexts, embodiments allow for efficient concurrent use of the same plurality of semantic objects without requiring finer-grained concurrency control (such as synchronization) which enables some embodiments of the language service embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a semantic analysis engine, the semantic analysis engine being a process that applies specific rules to derive characteristics of a group of objects where small deltas occur over a large number of objects, a method of computing responses to semantic queries, the method comprising:
   accessing a plurality of objects that represent source code for an input program;
   transforming the source code into a plurality of immutable objects that are structured such that the immutable objects derive any response as defined by a set of semantic rules about the source code;
   receiving a query from a requestor requesting a semantic characteristic of the input program;
   calculating the semantic characteristic;
   returning the semantic characteristic to the requestor;
   caching the semantic characteristic in a cache; and
   storing information describing a dependency between the cached semantic characteristic and one or more of the objects in the plurality of objects.

2. The method of claim 1, further comprising detecting a change in one or more of the objects depended upon, and as a result invaliding the cached semantic characteristic.

3. The method of claim 1, wherein calculating the semantic characteristic is performed as a result of calculating a plurality of semantic characteristics.

4. The method of claim 1, further comprising:
   receiving another query requesting the semantic characteristic of the input program;
   retrieving the semantic characteristic from the cache; and
   returning the semantic characteristic without recalculating the semantic characteristic.

5. The method of claim 1, wherein the dependency is computed according to a compilation granularity identifying objects that are individually changeable over time, and wherein the dependency can be on individual objects and their names.

6. The method of claim 1, wherein caching the semantic characteristic comprises caching the semantic characteristic with other related semantic characteristics to create an aggregated semantic characteristic.

7. The method of claim 6, further comprising as a result of creating the aggregated semantic characteristic flushing the semantic characteristic and related semantic characteristics while retaining the aggregated semantic characteristic.

8. The method of claim 1, wherein calculating the semantic characteristic is performed independently of error checking of the plurality of objects.

9. The method of claim 1, comprising, while the act of calculating is occurring receiving another identical query to query requesting a semantic characteristic of the input program currently being computed and as a result caching an indicator indicating that the semantic characteristic is cyclical.

10. The method of claim 1, wherein calculating the semantic characteristic is performed by only calculating characteristics necessary to calculate the semantic characteristic.

11. The method of claim 1, wherein the query is received as a result of an input feedback mechanism needing characteristics to respond to user input.

12. The method of claim 11, wherein the input feedback mechanism is an auto-complete feedback mechanism.

13. The method of claim 1, wherein calculating the semantic characteristic comprises using already calculated characteristics stored in the cache as operands.

14. A physical storage media having stored thereon computer-executable instructions that, when executed by one or more processors, cause a computing system to perform a method for determining responses to semantic queries, and wherein the method is comprised of the following:
   accessing a plurality of objects that represent source code for an input program;
   transforming the source code into a plurality of immutable objects that are structured such that the immutable objects derive any response as defined by a set of semantic rules about the source code;
   receiving a query from a requestor requesting a semantic characteristic of the input program;
   calculating the semantic characteristic;
   returning the semantic characteristic to the requestor;
   caching the semantic characteristic in a cache; and
   storing information describing a dependency between the cached semantic characteristic and one or more of the objects in the plurality of objects.

15. The computer program product of claim 14, wherein the stored computer-executable instructions for the method further comprise instructions for detecting a change in one or more of the objects depended upon, and as a result invaliding the cached semantic characteristic.

16. The computer program product of claim 14, wherein the stored computer-executable instructions for the method further comprise instructions for:
   receiving another query requesting the semantic characteristic of the input program;
   retrieving the semantic characteristic from the cache; and
   returning the semantic characteristic without recalculating the semantic characteristic.

17. The computer program product of claim 14, wherein the dependency is computed according to a compilation granularity identifying objects that are individually changeable over time, and wherein the dependency can be on individual objects and their names.

18. The computer program product of claim 14, wherein the stored computer-executable instructions for the method further comprise instructions for performing the following: while the act of calculating is occurring:
   receiving another identical query to the query requesting a semantic characteristic of the input program currently being computed and as a result caching an indicator indicating that the semantic characteristic is cyclical.

19. The computer program product system of claim 14, wherein calculating the semantic characteristic is performed by only calculating characteristics necessary to calculate the semantic characteristic.

20. In a computing environment comprising a semantic analysis engine, the semantic analysis engine being a process that applies specific rules to derive characteristics of a group of objects where small deltas occur over a large number of objects, a physical storage media having computer executable instructions stored thereon, that when executed by one or more processors, cause the processors to perform the following:
   accessing a plurality of objects that represent source code for an input program;
   transforming the source code into a plurality of immutable objects that are structured such that the immutable objects derive any response as defined by a set of semantic rules about the source code;
   receiving a query from a requestor requesting a semantic characteristic of the input program;
   calculating the semantic characteristic, wherein calculating the semantic characteristic is performed by only calculating characteristics necessary to calculate the semantic characteristic;
   returning the semantic characteristic to the requestor;
   caching the semantic characteristic in a cache;
   storing information describing a dependency between the cached semantic characteristic and one or more of the objects in the plurality of objects; and
   receiving another identical query to the query requesting a semantic characteristic of the input program currently being computed and as a result caching an indicator indicating that the semantic characteristic is cyclical.

21. A computing system comprising a semantic analysis engine, the semantic analysis engine being a process that applies specific rules to derive characteristics of a group of objects where small deltas occur over a large number of objects, the system further comprising one or more computer processors and computer-executable code for performing a method of computing responses to semantic queries, the method comprising:
   accessing a plurality of objects that represent source code for an input program; transforming the source code into a plurality of immutable objects that are structured such that the immutable objects derive any response as defined by a set of semantic rules about the source code;
   receiving a query from a requestor requesting a semantic characteristic of the input program;
   calculating the semantic characteristic;
   returning the semantic characteristic to the requestor;
   caching the semantic characteristic in a cache; and
   storing information describing a dependency between the cached semantic characteristic and one or more of the objects in the plurality of objects.

22. The system of claim 21, further comprising detecting a change in one or more of the objects depended upon, and as a result invaliding the cached semantic characteristic.

23. The system of claim 21, wherein calculating the semantic characteristic is performed as a result of calculating a plurality of semantic characteristics.

24. The system of claim 21, further comprising:
   receiving another query requesting the semantic characteristic of the input program;
   retrieving the semantic characteristic from the cache; and
   returning the semantic characteristic without recalculating the semantic characteristic.

25. The system of claim 21, wherein the dependency is computed according to a compilation granularity identifying objects that are individually changeable over time, and wherein the dependency can be on individual objects and their names.

26. The system of claim 21, wherein caching the semantic characteristic comprises caching the semantic characteristic with other related semantic characteristics to create an aggregated semantic characteristic.

27. The system of claim 26, further comprising as a result of creating the aggregated semantic characteristic flushing the semantic characteristic and related semantic characteristics while retaining the aggregated semantic characteristic.

28. The system of claim 21, wherein calculating the semantic characteristic is performed independently of error checking of the plurality of objects.

29. The system of claim 21, comprising, while the act of calculating is occurring receiving another identical query to query requesting a semantic characteristic of the input program currently being computed and as a result caching an indicator indicating that the semantic characteristic is cyclical.

30. The system of claim 21, wherein calculating the semantic characteristic is performed by only calculating characteristics necessary to calculate the semantic characteristic.

31. The system of claim 21, wherein the query is received as a result of an input feedback mechanism needing characteristics to respond to user input.

32. The system of claim 31, wherein the input feedback mechanism is an auto- complete feedback mechanism.

33. The system of claim 21, wherein calculating the semantic characteristic comprises using already calculated characteristics stored in the cache as operands.

34. A computing system comprising a semantic analysis engine, the semantic analysis engine being a process that applies specific rules to derive characteristics of a group of objects where small deltas occur over a large number of objects, the computing system further comprising one or more processors and physical storage media having computer executable instructions stored thereon that, when executed by the one or more processors, cause the processors to perform the following:
- accessing a plurality of objects that represent source code for an input program;
- transforming the source code into a plurality of immutable objects that are structured such that the immutable objects derive any response as defined by a set of semantic rules about the source code;
- receiving a query from a requestor requesting a semantic characteristic of the input program;
- calculating the semantic characteristic, wherein calculating the semantic characteristic is performed by only calculating characteristics necessary to calculate the semantic characteristic;
- returning the semantic characteristic to the requestor;
- caching the semantic characteristic in a cache;
- storing information describing a dependency between the cached semantic characteristic and one or more of the objects in the plurality of objects; and
- receiving another identical query to the query requesting a semantic characteristic of the input program currently being computed and as a result caching an indicator indicating that the semantic characteristic is cyclical.

* * * * *